(12) United States Patent
Egi

(10) Patent No.: US 11,199,822 B2
(45) Date of Patent: Dec. 14, 2021

(54) CONTROL DEVICE

(71) Applicant: OMRON Corporation, Kyoto (JP)

(72) Inventor: Mamoru Egi, Otsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/644,186

(22) PCT Filed: Dec. 14, 2018

(86) PCT No.: PCT/JP2018/046199
§ 371 (c)(1),
(2) Date: Mar. 4, 2020

(87) PCT Pub. No.: WO2019/117307
PCT Pub. Date: Jun. 20, 2019

(65) Prior Publication Data
US 2020/0218207 A1 Jul. 9, 2020

(30) Foreign Application Priority Data

Dec. 15, 2017 (JP) .............................. JP2017-240771

(51) Int. Cl.
*G05B 13/04* (2006.01)
*G05B 19/05* (2006.01)

(52) U.S. Cl.
CPC ......... *G05B 13/048* (2013.01); *G05B 13/042* (2013.01); *G05B 19/058* (2013.01)

(58) Field of Classification Search
None
See application file for complete search history.

(56) References Cited

U.S. PATENT DOCUMENTS 4,218,733 A * 8/1980 Maselli .............. G05B 13/0205
318/561
5,265,188 A 11/1993 Andoh
(Continued)

FOREIGN PATENT DOCUMENTS

JP S63-283490 A 11/1988
JP H01-240903 A 9/1989
(Continued)

OTHER PUBLICATIONS

Chen et al., "Design of decentralized PI control systems based on Nyquist stability analysis", 2003, Journal of Process Control 13, pp. 33-39 (Year: 2003).*
(Continued)

*Primary Examiner* — Mohammad Ali
*Assistant Examiner* — David Earl Ogg
(74) *Attorney, Agent, or Firm* — Metrolex IP Law Group, PLLC

(57) ABSTRACT

The present invention provides a control device that executes model predictive control related to a predetermined control target corresponding to an actual target device which is an actual target of servo control in order to cause an output of the actual target device to track a predetermined command. The control device includes: an integrator which receives input of a deviation between the predetermined command and an output of the predetermined control target; and a model predictive control unit which has a prediction model that defines a correlation between a predetermined state variable and an input to the predetermined control target in a form of a predetermined state equation, and which performs model predictive control based on the prediction model according to a predetermined evaluation function in a prediction section having a predetermined time width using the output of the integrator as an input.

12 Claims, 13 Drawing Sheets

(56) References Cited

U.S. PATENT DOCUMENTS

| | | | |
|---|---|---|---|
| 5,347,446 A * | 9/1994 | Iino | G05B 13/048 |
| | | | 700/29 |
| 5,483,439 A | 1/1996 | Ono et al. | |
| 6,264,111 B1 * | 7/2001 | Nicolson | F24F 11/30 |
| | | | 236/51 |
| 2010/0268353 A1 | 10/2010 | Crisalle et al. | |
| 2012/0109620 A1 | 5/2012 | Gaikwad et al. | |
| 2016/0170384 A1 | 6/2016 | Charest-Finn et al. | |
| 2018/0032651 A1 * | 2/2018 | Snyder | G06F 30/13 |

FOREIGN PATENT DOCUMENTS

| | | | |
|---|---|---|---|
| JP | H2-83702 A | 3/1990 | |
| JP | H04-348402 A | 12/1992 | |
| JP | H05-35309 A | 2/1993 | |
| JP | H05-233007 A | 9/1993 | |
| JP | H6-138906 A | 5/1994 | |
| JP | 2003-84804 A | 3/2003 | |
| JP | 2003-169488 A | 6/2003 | |
| JP | 2003-195905 A | 7/2003 | |
| JP | 2007-25888 A | 2/2007 | |
| JP | 4922954 B2 * | 4/2012 | |

OTHER PUBLICATIONS

Liu et al., "The Application of Predictive Functional Control for Permanent Magnet Synchronous Motor Servo System", 2010, IEEE 978-1-4244-7101-0/10, pp. 593-596 (Year: 2010).*
English translation of the International Search Report("ISR") of PCT/JP2018/046199 dated Feb. 19, 2019.
English translation of the Written Opinion("WO") of PCT/JP2018/046199 dated Feb. 19, 2019.
Yuta Sakurai et al.: "Offset Compensation of Continuous Time Model Predictive Conlrol By Disturbance Estimation", 2012, pp. 172-180, vol. 25, No. 7, Journal of Institute of Systems, Control and Information Engineers, Concise explanation of relevance provided in the specification.
J. Maeder et al.: "Linear offset-free model predictive control", 2009, pp. 2214-2222, vol. 45, No. 10, Automatica, Concise explanation of relevance provided in the specification.
Extended European search report (EESR) dated Jul. 19, 2021 in a counterpart European patent application EP 18888916.
Yen-Chung Liu et al., "Model Predictive Control with Integral Control and Constraint Handling for Mechatronic Systems", Proceedings of the 2010 International Conference on Modelling, Identification and Control, 2010, pp. 424-429.
Japanese Office Action (JPOA) dated Sep. 7, 2021 in a counterpart Japanese patent application JP2018-234842.

* cited by examiner

CONTROL DEVICE

TECHNICAL FIELD

The present invention relates to a control device that servo-controls a control target.

BACKGROUND ART

Generally, feedback control is used in order to control a control target to track a command trajectory. For example, a control device of an articulated robot controls servo motors of respective joint shafts using feedback control so that the position of a hand of the robot tracks a command trajectory set (taught) in advance. However, general feedback control has a problem that since a response delay occurs inevitably in each servo motor, the actual trajectory of the robot deviates from the command trajectory. Techniques related to model predictive control are used to suppress such a deviation from the command trajectory.

When a servo system is constructed using feedback control, a steady-state deviation occurs in the control system if an unknown disturbance is present. Moreover, even when model predictive control is used, a steady-state deviation may occur if a target trajectory for a command changes frequently as in tracking control. Therefore, when a servo system is constructed using model predictive control, the steady-state deviation may be eliminated by connecting an integrator to a compensator thereof in series. Moreover, the steady-state deviation can be removed in principle by incorporating an assumed disturbance into the model by regarding the disturbance as a new state. For example, NPL 1 and NPL 2 propose methods for constructing a disturbance observer and cancelling a steady-state deviation using a disturbance estimated by the disturbance observer.

CITATION LIST

Non Patent Literature

NPL 1: Yuta Sakurai and Toshiyuki Ohtsuka: Offset Compensation of Continuous Time Model Predictive Control By Disturbance Estimation; Journal of Institute of Systems, Control and Information Engineers, Vol. 25, No. 7, pp. 10-18 (2012)

NPL 2: U. Maeder and M. Morari: Linear offset-free model predictive control; Automatica, Vol. 45, No. 10, pp. 2214-2222 (2009)

SUMMARY OF INVENTION

Technical Problem

As described above, when a servo system is constructed using model predictive control and an integrator is connected to the compensator thereof in series, the output of a control target overshoots and a transient response thereof may deteriorate significantly. Therefore, in general, when model predictive control is used, it is avoided to construct a servo system by incorporating an integrator therein.

Moreover, when a disturbance observer is constructed in the above-described manner, since a disturbance is regarded as a new state, the number of state variables incorporated into the model predictive control increases and the computational load related to the model predictive control increases. It is generally known that the computational load increases when model predictive control is used. However, when a disturbance observer is used, the computational load increases further, and designing of a disturbance observer for cancelling the influence of a disturbance appropriately is difficult, and it is not easy to construct a practical servo system.

The present invention has been made in view of the above-described problems, and an object thereof is to provide a control device capable of obtaining an ideal transient response while facilitating designing of a servo system when constructing the servo system using model predictive control.

Solution to Problem

In order to solve the problems, the present invention employs a configuration in which a prediction model for model predictive control includes an integral term obtained by multiplying a predetermined integral gain with a deviation between a command to a control target and an output of the control target. Specifically, the present invention provides a control device that executes model predictive control related to a predetermined control target corresponding to an actual target device which is an actual target of servo control in order to cause an output of the actual target device to track a predetermined command, the control device including: an integrator which receives input of a deviation between the predetermined command and an output of the predetermined control target; a state acquisition unit that acquires a value of a predetermined state variable related to the predetermined control target; and a model predictive control unit which has a prediction model that defines a correlation between the predetermined state variable and an input to the predetermined control target in a form of a predetermined state equation, and which performs the model predictive control based on the prediction model according to a predetermined evaluation function in a prediction section having a predetermined time width using the output of the integrator as an input and outputs a value of the input at least at an initial time point of the prediction section as an input to the predetermined control target corresponding to the predetermined command. The prediction model includes a predetermined integral term represented by a product of a predetermined integral gain and the deviation between the output of the predetermined control target and the predetermined command.

In the control device of the present invention, an integration process is performed by the integrator, and model predictive control is performed using the prediction model included in the model predictive control unit. In the model predictive control, a prediction section having a predetermined time width is set at each control timing, control is performed according to a predetermined evaluation function in the prediction section, and an input value calculated at least at an initial time point of the prediction section is provided as an input to the control target. As a result of the input, an obtained value of a state variable indicating the state of the control target is acquired by the state acquisition unit and is provided for the next model predictive control. Therefore, in the model predictive control, the prediction section moves with the elapse of a control period, and so-called Receding Horizon control is executed.

Here, in the control device, the model predictive control unit is formed so that a predetermined integral term represented by a product of a predetermined integral gain and a deviation between an output of the control target and a command is included in a prediction model. With such a configuration, model predictive control is performed on the basis of the deviation, and the model predictive control is performed in parallel with an arithmetic process outside the model predictive control unit (that is, an integration process in the integrator). Therefore, it is possible to effectively eliminate a steady-state deviation without unnecessarily deteriorating a transient response in the servo control. Moreover, the control device aims to eliminate a steady-state deviation by including a predetermined integral term in the prediction model and does not employ a process involving a relatively large computational load such as an observer for estimating a disturbance which causes a steady-state deviation as in the conventional technique. Such a disturbance observer needs to expand a disturbance model included in the observer when a target trajectory changes frequently and needs to design the gain of the disturbance observer by taking the stability of a control system into consideration. Therefore, it is not easy to design the disturbance observer according to a practical situation. Therefore, the control device of the present invention can alleviate a load required for designing a control system greatly and can realize servo control ideal for a predetermined control target.

Here, the following two specific embodiments can be exemplified as the control device. In a first embodiment, the predetermined control target may be the actual target device itself. In this case, the control device has a feedback system that feeds back the output of the actual target device, a deviation between the predetermined command and the output of the actual target device fed back by the feedback system is input to the integrator, the state acquisition unit acquires a value of the predetermined state variable related to the actual target device, and the prediction model is a model that defines a correlation between the predetermined state variable and the input to the actual target device, and the predetermined integral term included in the prediction model is represented by a product of the predetermined integral gain and a deviation between the output of the actual target device and the predetermined command. That is, in the first embodiment, model predictive control which uses a prediction model including the predetermined integral term is performed using a state variable related to the actual target device. In this case, model predictive control is performed by the feedback system including the actual target device, and the output trackability of the actual target device is optimized.

In a second embodiment, the predetermined control target may be an actual target model that models the actual target device. In this case, the control device further includes: an actual target model control unit which includes an actual target model which is a model that models the actual target model and which is the predetermined control target and which simulates and outputs an output of the actual target device. The output of the actual target model control unit is configured to be supplied to the actual target device, a deviation between the predetermined command and the output of the actual target model control unit is input to the integrator, the state acquisition unit acquires a value of the predetermined state variable related to the actual target model included in the actual target model control unit, and the prediction model is a model that defines a correlation between the predetermined state variable and the input to the actual target model control unit, and the predetermined integral term included in the prediction model is represented by a product of the predetermined integral gain and a deviation between the output of the actual target model and the predetermined command. That is, in the second embodiment, model predictive control which uses a prediction model including the predetermined integral term is performed using a state variable related to the actual target model that models the actual target device. In this case, although the model predictive control is not performed by the feedback system including the actual target device, since the model predictive control is performed by a system including the actual target model, the output of the model predictive control unit, which guarantees optimal trackability of the output is finally supplied to the actual target device.

Here, the control device may further include a gain adjustment unit that adjusts the predetermined integral gain so that the predetermined integral gain increases as a magnitude of the deviation decreases. The magnitude of the deviation can be represented by an absolute value of the deviation, for example, or may be represented by another form (for example, a square of the deviation) having a correlation with the magnitude. Since the gain adjustment unit adjusts the predetermined integral gain in this manner, when the magnitude of the deviation is large (that is, when the output of the predetermined control target deviates greatly from a command), the predetermined integral gain is adjusted to be small. As a result, the predetermined integral gain is adjusted so that the integration amounts in model predictive control do accumulate excessively. Moreover, when the magnitude of the deviation is small, the predetermined integral gain is adjusted to be large, and servo control based on the integration amount in the model predictive control is accelerated. As a result, the control device can ideally realize servo control of a predetermined control target while suppressing an overshoot during a transient response effectively.

In the control device, the gain adjustment unit may adjust the predetermined integral gain to be large as the magnitude of the deviation decreases when the value of the deviation belongs to a predetermined first range including zero and may set the predetermined integral gain to zero when the value of the deviation does not belong to the predetermined first range. By executing servo control based on the integration amount in the model predictive control only when the value of the deviation belongs to the predetermined first range in this manner, an overshoot during a transient response can be suppressed more ideally. The predetermined first range can be set appropriately by taking the trackability to a predetermined command by the servo control and an allowable overshoot amount or the like into consideration.

Here, in the control device, the predetermined control target may have a plurality of control axes. In this case, a command to the predetermined control target, an input to the predetermined control target, and an output to the predetermined control target may be correlated with the plurality of control axes, and the prediction model may be defined by the predetermined state equation so as to correspond to each of the plurality of control axes and may include a plurality of the predetermined integral terms corresponding to the plurality of control axes. Even when the control device performs servo control on a plurality of control axes of a predetermined control target, it is possible to construct the prediction model so as to correspond to each control axis. Moreover, since the prediction model includes a predetermined integral term corresponding to each control axis, it is possible to realize servo control ideal for all control axes of the predetermined control target.

Here, when the predetermined control target includes a plurality of control axis, the gain adjustment unit may adjust the predetermined integral gain corresponding to each of the plurality of control axes according to the magnitude of the deviation corresponding to each of the plurality of control axes. Moreover, the gain adjustment unit may adjust the predetermined integral gain corresponding to each of the plurality of control axes so as to increase as a relative magnitude of the deviation corresponding to each of the plurality of control axes increases. In the servo control of each control axis performed according to model predictive control in this manner, since the magnitude of the integral gain of each control axis is adjusted on the basis of the relative magnitude of the deviations corresponding to the control axes, it is possible to equalize the trackabilities to commands in the respective control axes.

As another method, when the predetermined control target includes a plurality of control axes and a predetermined working coordinate system is set in the predetermined control target on the basis of the plurality of control axes, the gain adjustment unit may adjust the predetermined integral gain corresponding to each of the plurality of control axes according to a magnitude in the predetermined working coordinate system, of the deviation corresponding to each of the plurality of control axes. Moreover, the gain adjustment unit may adjust the predetermined integral gain corresponding to each of the plurality of control axes so as to increase as a relative magnitude of the deviation converted to the predetermined working coordinate system, corresponding to each of the plurality of control axes increases. Even when the relative magnitude of the deviations converted to the predetermined working coordinate system, corresponding to the control axes is used, it is possible to equalize the trackabilities to commands in the respective control axes. Particularly, by adjusting the integral gain of each control axis by taking a predetermined working coordinate system into consideration, it is possible to allow the output of the predetermined control target in the predetermined working coordinate system to ideally track the commands.

Here, in the control device, the gain adjustment unit may calculate the predetermined integral gain according to a gain setting function that is differentiable on the basis of the deviation. In this way, it is possible to perform an arithmetic process in the model predictive control stably. As another method, when the gain adjustment unit includes a gain setting function related to the deviation, for calculating the predetermined integral gain, and the gain setting function is differentiable on the basis of the deviation, the gain adjustment unit may calculate the predetermined integral gain according to the gain setting function. Moreover, when the gain setting function is not differentiable on the basis of the deviation, the gain adjustment unit may perform a predetermined stabilization process for stabilizing an arithmetic process of the model predictive control by the model predictive control unit and may calculate the predetermined integral gain according to the gain setting function. By performing a stabilization process in this manner, even when the gain setting function is not differentiable on the basis of a deviation, it is possible to perform an arithmetic process in the model predictive control stably.

In the control device, the prediction model may include an HPF processing term represented by a product of the output of the integrator and a predetermined filtering gain correlated with a high-pass filtering process on the deviation in addition to the predetermined integral term wherein the predetermined integral gain is one. In this case, when the value of the deviation is outside a predetermined second range including zero, the predetermined filtering gain may be set such that a cutoff frequency decreases as the magnitude of the deviation approaches a boundary of the predetermined second range in the high-pass filtering process.

Furthermore, when the value of the deviation belongs to the predetermined second range, the predetermined filtering gain may be set to zero.

In the control device, when the value of the deviation is within the predetermined second range, servo control is performed on the basis of the integration amount of the model predictive control when the predetermined integral gain was set to one. In contrast, when the value of the deviation is outside the predetermined second range, a predetermined high-pass filtering process based on the HPF processing term is performed on the deviation, the influence of a relatively old deviation is alleviated. As a result, an overshoot resulting from accumulation of an integration amount of deviations is suppressed. Moreover, when the filtering gain correlated with the high-pass filtering process is correlated with a distance to the predetermined second range in which the integration process is performed by setting the cutoff frequency of the high-pass filtering process in the above-described manner, it is possible to suppress accumulation of an integration amount as the value of the deviation deviates from the region and to contribute to suppression of an overshoot. The predetermined second range can be set appropriately by taking the trackability to a predetermined command by the servo control and an allowable overshoot amount or the like into consideration.

Advantageous Effects of Invention

A control device capable of obtaining an ideal transient response while facilitating designing of a servo system when constructing the servo system using model predictive control can be provided.

DESCRIPTION OF EMBODIMENTS

First Embodiment

Figure 1:
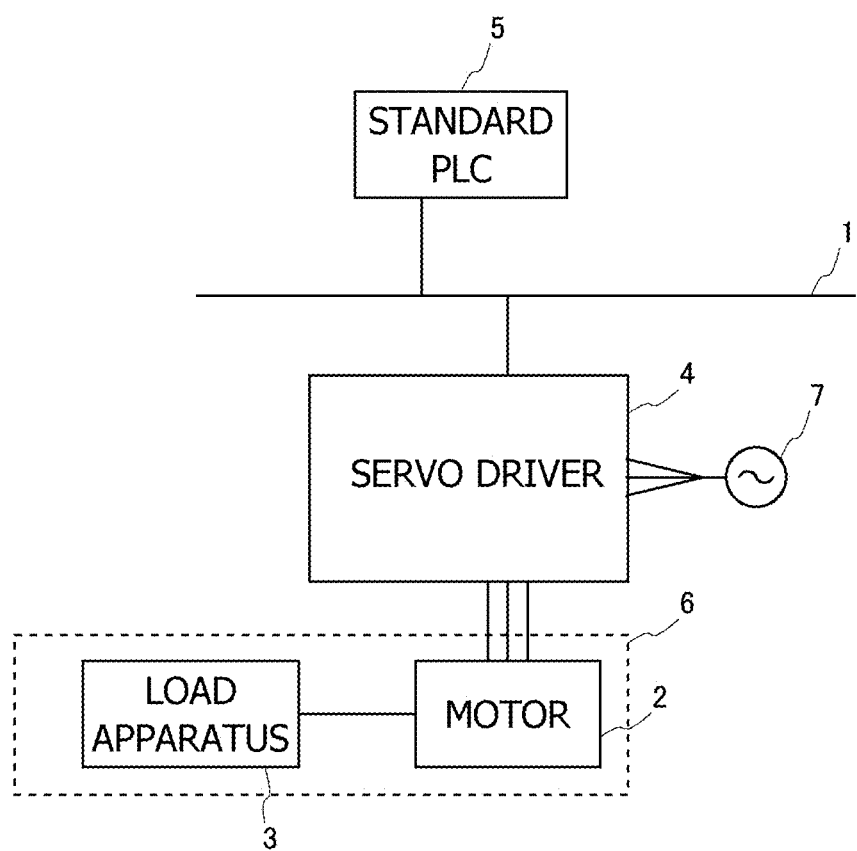
FIG. 1 is a diagram illustrating a schematic configuration of a control system configured to include a control device according to the present invention.

FIG. 1 is a diagram illustrating a schematic configuration of a control system including a servo driver 4 which is a control device according to an embodiment of the present invention. The control system includes a network 1, a servo driver 4, and a standard PLC (Programmable Logic Controller) 5. The servo driver 4 is a control device for servo-controlling a plant 6 including a motor 2 and a load device 3. In the control system, the servo driver 4 servo-controls the plant 6 so that the plant 6 tracks a command signal generated by the standard PLC 5. In this case, examples of the load device 3 that constitutes the plant 6 include various mechanisms (e.g., arms of industrial robots and conveyance devices), and the motor 2 is incorporated in the load device 3 as an actuator that drives the load device 3. For example, the motor 2 is an AC servo motor. An encoder (not illustrated) is attached to the motor 2, and a parameter signal (a position signal, a velocity signal, and the like) related to an operation of the motor 2 is transmitted to the servo driver 4 as a feedback signal by the encoder.

Figure 2:
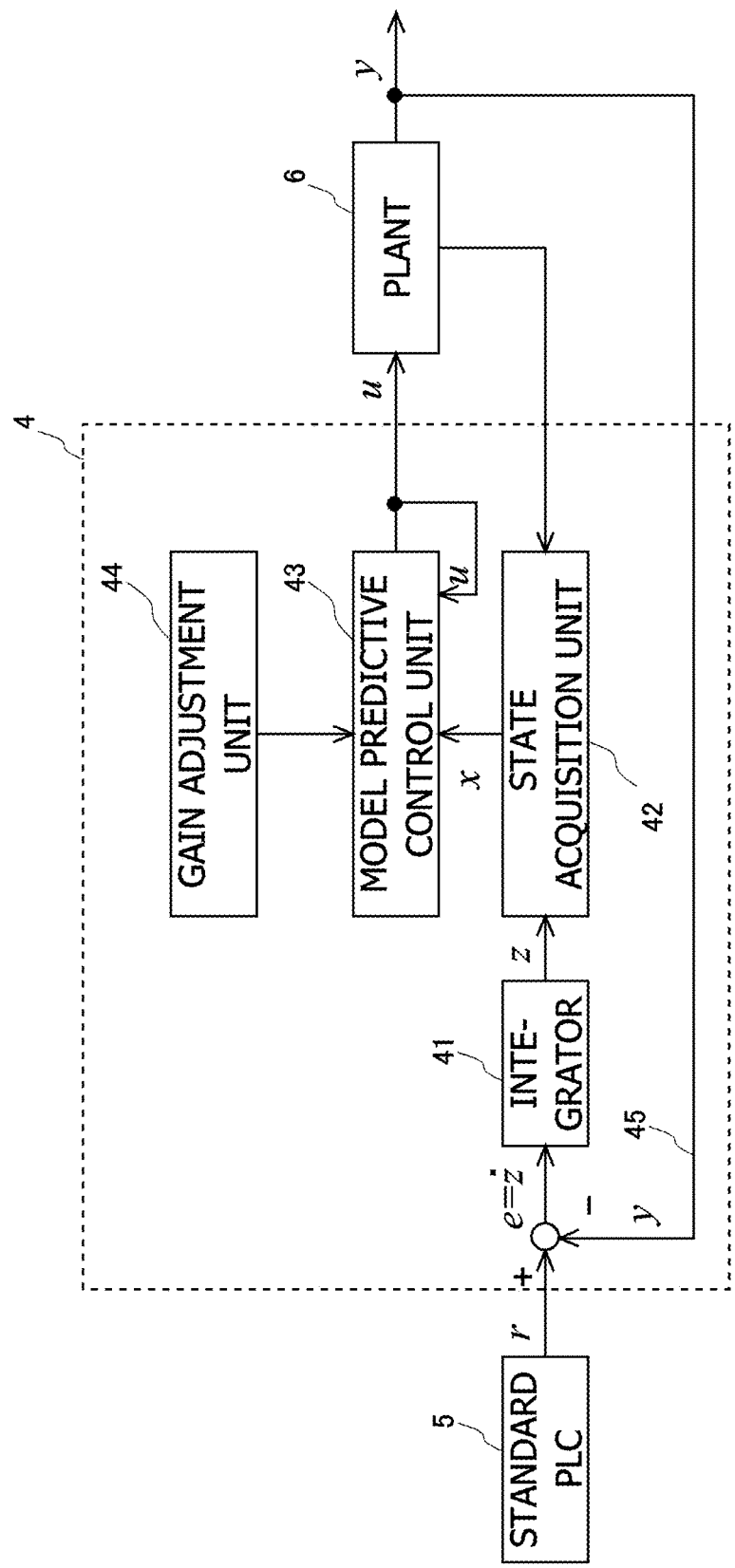
FIG. 2 is a first diagram illustrating a control structure of a servo driver included in the control system illustrated in FIG. 1.

The standard PLC 5 generates a command signal related to an operation (motion) of the plant 6 and transmits the same to the servo driver 4. The servo driver 4 receives the command signal from the standard PLC 5 via the network 1 and receives the feedback signal output from the encoder connected to the motor 2. The servo driver 4 supplies a driving current to the motor 2 on the basis of the command signal and the feedback signal from the encoder so that servo control related to driving of the plant 6 is performed (that is, the output of the plant 6 tracks the command). The supplied current is an AC power delivered from an AC power supply 7 to the servo driver 4. In the present embodiment, the servo driver 4 is a type that receives a three-phase AC power but may be a type that receives a single-phase AC power. As the servo control of the servo driver 4, model predictive control of a model predictive control unit 43 is executed as illustrated in FIG. 2.

A control structure in the servo driver 4 will be described with reference to FIG. 2. The servo driver 4 includes an integrator 41, a state acquisition unit 42, a model predictive control unit 43, and a gain adjustment unit 44. A deviation e (e=r−y) between a command r transmitted from the standard PLC 5 and an output y of the plant 6 fed back by a feedback system 45 is input to the integrator 41. An output z of the integrator 41 is input to the model predictive control unit 43 through the state acquisition unit 42.

In this case, the state acquisition unit 42 acquires the value of a state variable included in a state x related to the plant 6, provided to model predictive control performed by the model predictive control unit 43. For example, the state acquisition unit 42 can acquire predetermined information generated from an output signal of the encoder connected to the motor 2 included in the plant 6 as the state variable included in the state x. Moreover, a predetermined parameter (for example, the position of an output unit of the load device 3 or the like) related to the load device 3 included in the plant 6 may be acquired as a state variable included in the state x. Furthermore, in the present embodiment, the state acquisition unit 42 also acquires the output z of the integrator 41 as the state variable included in the state x. The model predictive control unit 43 executes model predictive control (Receding Horizon control) using the state x related to the plant 6 acquired by the state acquisition unit 42 and an input u to the plant 6 input by the model predictive control unit 43.

Specifically, the model predictive control unit 43 has a prediction model that defines a correlation between the state x related to the plant 6 and the input u to the plant 6 using a state equation (Equation 1) below. Equation 1 below is a nonlinear state equation.

[Math. 1]

$$\dot{x}(t) = P(x(t), u(t)) \qquad \text{(Equation 1)}$$

Here, the model predictive control unit 43 performs model predictive control based on the prediction model represented by Equation 1 according to an evaluation function represented by Equation 2 below in a prediction section having a predetermined time width T using the state x related to the plant 6 and the input u to the plant 6 as an input.

[Math. 2]

$$J = \varphi(x(t+T)) + \int_t^{t+T} L(x(\tau), u(\tau)) d\tau \qquad \text{(Equation 2)}$$

The value of the input u at an initial time point t of the prediction section, calculated in the model predictive control is output as the input u to the plant 6 corresponding to the command r at that time point t. In model predictive control, a prediction section having a predetermined time width T is set at each control timing thereof, and the input u to the plant 6 at that control timing is calculated according to the evaluation function of Equation 2 and is transmitted to the plant 6. A problem of calculating an operation amount that optimizes a value of an evaluation function J having such a form as in Equation 2 is a problem widely known as an optimal control problem, and an algorithm for calculating a numerical solution thereof is disclosed as a known technique. A continuous deformation method can be exemplified as such a technique, and the details thereof are disclosed, for example, in "A continuation/GMRES method for fast computation of nonlinear receding horizon control", T. Ohtsuka, Automatica, Vol. 40, pp. 563-574 (2004), for example.

In a continuous deformation method, an input U(t) to model predictive control is calculated by solving a simultaneous linear equation related to the input U(t) illustrated in Equation 3 below. Specifically, Equation 3 is solved and dU/dt is numerically integrated to update the input U(t). In this manner, since the continuous deformation method does not perform repeated computation, it is possible to suppress a computational load for calculating the input U(t) at each time point as much as possible.

[Math. 3]

$$\frac{\partial F}{\partial U}\dot{U} = -\zeta F - \frac{\partial F}{\partial x}\dot{x} - \frac{\partial F}{\partial t}$$ (Equation 3)

Where F and U(t) are represented by Equation 4 below.

[Math. 4]

$$F(U(t), x(t), t) = \begin{bmatrix} \frac{\partial H}{\partial u}(x_0^*(t), u_0^*(t), \lambda_1^*(r), \mu_{0^*}(t)) \\ C(x_0^*(t), u_0^*(t)) \\ \cdots \\ \frac{\partial H}{\partial u}(x_{N\_1}^*(t), u_{N\_1}^*(t), \lambda_N^*(t), \mu_{N\_1}^*(t)) \\ C(x_{N\_1}^*(t), u_{N\_1}^*(t)) \end{bmatrix}$$ (Equation 4)

$$U(t) = [u_0^{*T}(t), \mu_0^{*T}(t), \ldots, u_{N\_1}^{*T}(t), u_{N\_1}^{*T}(t)]$$

Where H is a Hamiltonian, λ is a costate, and μ is a Lagrange multiplier of constraints C=0.

Here, in the present embodiment, as illustrated in FIG. 2, a deviation e between the command r and the output y of the plant 6 is input to the integrator 41, and the output z of the integrator 41 is input to the model predictive control unit 43 through the state acquisition unit 42, whereby the model predictive control is performed. A prediction model included in the model predictive control unit 43 based on the control structure including the integrator 41 in this manner is formed as illustrated in Equation 5 below, for example. Predetermined physical characteristics of the plant 6 are applied to Equation 5.

[Math. 5]

$$\dot{x}(t) = P(x(t), u(t))$$ (Equation 5)

$$= \begin{bmatrix} \dot{x}_1 \\ \ddot{x}_1 \\ \dot{z}_1 \end{bmatrix} = \begin{bmatrix} \dot{x}_1 \\ \frac{u_1}{M_1} \\ (x_{f1} - x_1) \cdot K_{i1} \end{bmatrix}$$

A subscript "1" in Equation 5 indicates the number of control axes controlled by the servo driver 4, and in the present embodiment, since the number of control axes is one, the subscripts of the respective variables of the prediction model illustrated in Equation 5 are "1". A variable x1 of a state x indicates an output position of the plant 6 and is predetermined fed back as the output y of the plant 6. Moreover, $x_{f1}$ indicates a position command r to the control axis. Therefore, $(x_{f1}-x_1)$ in the prediction model indicates the deviation e. It can be understood that the prediction model includes an integral term represented by a product of the deviation e ($=x_{f1}-x_1$) and a predetermined integral gain $K_{i1}$. When the integral term is included in the prediction model in this manner, a control structure in which another virtual integrator separate from the integrator 41 is connected in parallel can be obtained in the servo driver 4. In this way, it is easy to adjust an integration amount serving as a driving source of the servo control performed by the servo driver 4 which uses model predictive control, and it is easy to realize servo control suppressing an overshoot without using a disturbance observer which requires difficult adjustment such as extension of a disturbance model or design of an observer gain as in the conventional technique.

Figure 3:
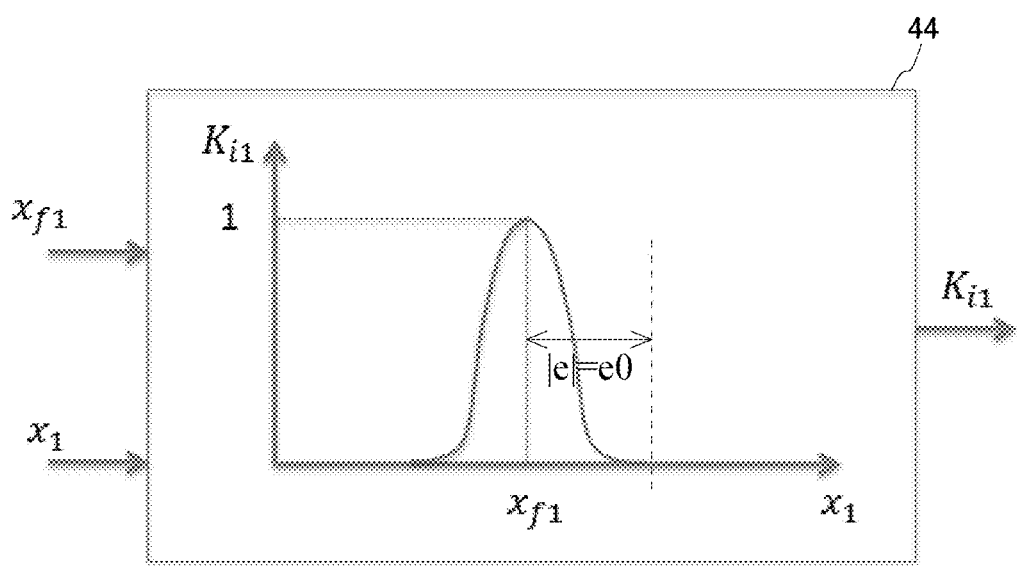
FIG. 3 is a first diagram illustrating a correlation between a deviation and a predetermined integral gain.

Furthermore, the control structure of the servo driver 4 includes a gain adjustment unit 44. The gain adjustment unit 44 is a functional unit that adjusts a predetermined integral gain $K_{i1}$ of an integral term included in the prediction model illustrated in Equation 5 on the basis of the deviation e. Specifically, as illustrated in FIG. 3, the gain adjustment unit 44 adjusts the predetermined integral gain $K_{i1}$ so that the value of the predetermined integral gain $K_{i1}$ increases as the magnitude of the deviation e decreases. Particularly, in FIG. 3, when the magnitude of the deviation e is equal to or larger than e0, the predetermined integral gain $K_{i1}$ is zero, and a value larger than zero and equal to or smaller than one is set as the predetermined integral gain $K_{i1}$ in a range in which the magnitude of the deviation e is smaller than e0. Moreover, the value of the predetermined integral gain $K_{i1}$ approaches abruptly one as the magnitude of the deviation e approaches zero, and the transition of the predetermined integral gain $K_{i1}$ is set so that the predetermined integral gain $K_{i1}$ is one when the magnitude of the deviation e is zero. In this manner, since the gain adjustment unit 44 can adjust the predetermined integral gain $K_{i1}$ on the basis of the magnitude of the deviation e, when an output $y(x_1)$ of the plant 6 deviates far from a command $x_{f1}$, the value of the predetermined integral gain $K_{i1}$ is adjusted to be small, and an integration amount for servo control is adjusted so as not to accumulate. Moreover, since the value of the predetermined integral gain $K_{i1}$ is adjusted to be large by the gain adjustment unit 44 when the amount of deviation of the output $y(x_1)$ of the plant 6 from the command $x_{f1}$ decreases (that is, the magnitude of the deviation e decreases), it is possible to effectively enhance the trackability of servo control. By varying the value of the predetermined integral gain $K_{i1}$ in this manner, it is possible to achieve both suppression of an overshoot and improvement in the trackability of servo control.

In adjustment of the predetermined integral gain $K_{i1}$ by the gain adjustment unit 44, data related to correlation between the deviation e and the predetermined integral gain $K_{i1}$ illustrated in FIG. 3 may be stored in the memory of the servo driver 4, and in that case, the gain adjustment unit 44 adjust the predetermined integral gain $K_{i1}$ by accessing the data. Moreover, as another method, the gain adjustment unit 44 may calculate the predetermined integral gain $K_{i1}$ according to a function for calculating the predetermined integral gain $K_{i1}$ illustrated in Equation 6 below.

[Math. 6]

$$K_{i1}=1/\exp(e^2 \times C1) \text{ or}$$

$$K_{i1}=1/\exp(|e|) \times C1$$ (Equation 6)

Figure 4:
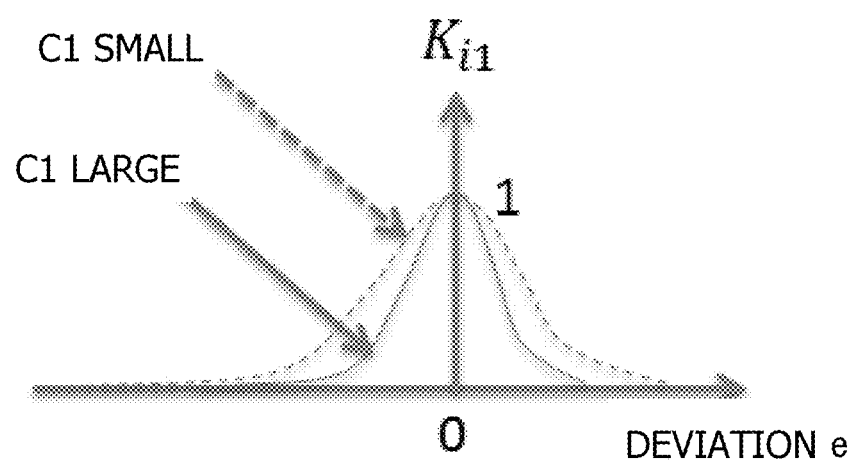
FIG. 4 is a second diagram illustrating a correlation between a deviation and a predetermined integral gain.

In Equation 6, a constant C1 is a coefficient for setting calculation sensitivity of the predetermined integral gain $K_{i1}$ with respect to the deviation e. For example, as illustrated in FIG. 4, when the value of the constant C1 decreases, change in the value of the predetermined integral gain $K_{i1}$ with respect to change in the magnitude of the deviation e becomes gentle. This means that, as the value of the constant C1 decreases, the predetermined integral gain $K_{i1}$ is set so as to correspond to a wider range of the deviation e. The constant C1 can be set appropriately on the basis of the control characteristics or the like of the plant 6, and for example, when an overshoot is likely to occur in the plant 6, it is preferable that the value of the constant C1 is set to be larger in order to make an integral term difficult to accumulate so as to suppress the overshoot. Moreover, the calculation function illustrated in Equation 6 is a function that is differentiable on the basis of the deviation e, and therefore, it is possible to stably perform model predictive control which uses the prediction model including the predetermined integral gain $K_{i1}$.

Figure 5A:
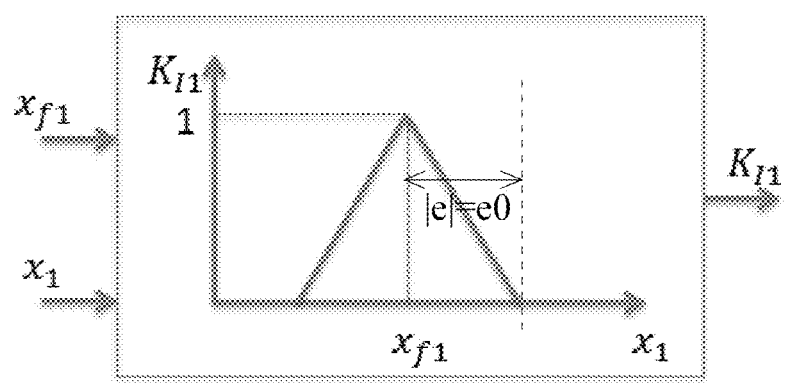
FIGS. 5A and 5B are third diagrams illustrating a correlation between a deviation and a predetermined integral gain.
Figure 5B:
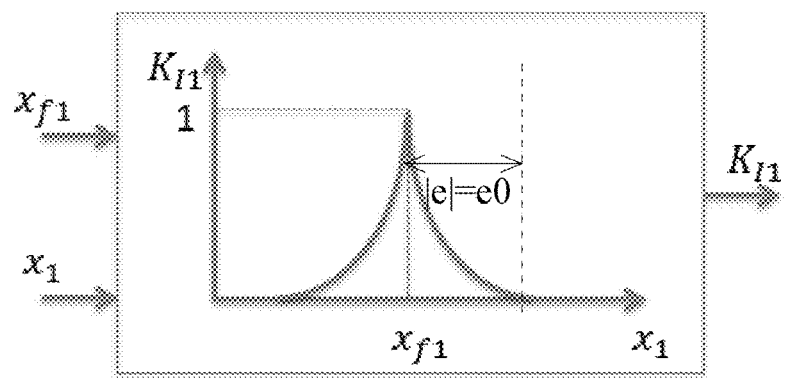

As still another method, in adjustment of the predetermined integral gain $K_{i1}$ by the gain adjustment unit 44, correlation between the deviation e and the predetermined integral gain $K_{i1}$ may be set as illustrated in FIGS. 5A and 5B. According to correlation illustrated in FIG. 5A, the predetermined integral gain $K_{i1}$ is one when the magnitude of the deviation e is zero, the predetermined integral gain $K_{i1}$ decreases linearly up to zero until the deviation e reaches e0, and the predetermined integral gain $K_{i1}$ is adjusted to zero when the deviation e becomes equal to or larger than e0. Moreover, according to correlation illustrated in FIG. 5B, the predetermined integral gain $K_{i1}$ is one when the magnitude of the deviation e is zero, the predetermined integral gain $K_{i1}$ decreases inproportionally up to zero until the deviation e reaches e0, and the predetermined integral gain $K_{i1}$ is adjusted to zero when the deviation e becomes equal to or larger than e0. In the transition of the predetermined integral gain $K_{i1}$ illustrated in both correlations illustrated in FIGS. 5A and 5B, the predetermined integral gain $K_{i1}$ is not differentiable when the deviation e is near zero. In such a case, it is preferable to take known countermeasures for preventing an arithmetic process of the model predictive control unit 43 from becoming unstable (that is, countermeasures for preventing abrupt change in a partial differential value of the Hamiltonian H such as for example, setting the value of the predetermined integral gain $K_{i1}$ to one and $\delta H/\delta x=0$).

<Modification>

Here, in the control system illustrated in FIG. 1, a direct control target of the servo driver 4 is the motor 2. When the output of the plant 6 that is to track a command is not a rotation angle of the motor 2 but is the position of an output unit of the load device 3 driven by the motor 2, a coordinate system related to a rotation axis of the motor 2 is not identical to a coordinate system (that is, a working coordinate system) related to the output unit of the load device 3. In such a case, it is preferable to perform adjustment for servo control of the output of the plant 6 immediately (particularly, adjustment of the predetermined integral gain included in a prediction model) by defining the prediction model of the model predictive control unit 43 on the basis of the working coordinate system.

Figure 6:
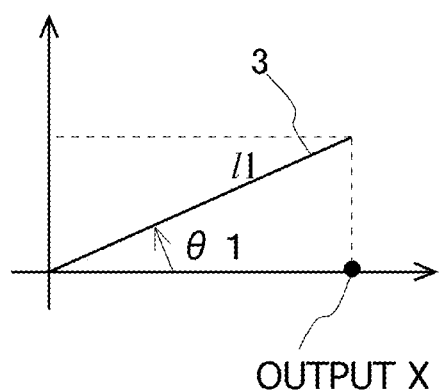
FIG. 6 is a diagram illustrating a state in which a working coordinate system is set in a plant.

For example, as illustrated in FIG. 6, when a rod-shaped load device 3 is rotated by rotation of the motor 2 and a position in a horizontal direction of a tip thereof is the output of the plant 6, a motion equation related to the load device 3 can be represented by Equation 7 below. It is assumed that a tip position of the load device 3 is fed back to the model predictive control unit 43 as a state variable included in the state x. In this modification, this tip position is represented as "x1" for the sake of convenience.

[Math. 7]

$$M\ddot{\theta}+C\dot{\theta}=U_q \quad \text{(Equation 7)}$$

Where $U_q$ is a driving torque for rotating the load device 3. Equation 8 below represents correlation between a rotation angle θ of the motor 2 and the tip position x1 of the load device 3.

[Math. 8]

$$\dot{x}_1 = \dot{J}\theta + J\dot{\theta}$$

$$\dot{\theta} = J^{-1}\dot{x}_1 \quad \text{(Equation 8)}$$

Where J represents a Jacobian matrix. In the case illustrated in FIG. 6, the Jacobian matrix is represented by Equation 9 below.

[Math. 9]

$$J = -l_1 \sin(\theta_1) = -\sqrt{l_1^2 - x_1^2}$$

$$\dot{J} = \frac{x_1}{\sqrt{l_1^2 - x_1^2}} \quad \text{(Equation 9)}$$

Equation 10 below is obtained on the basis of Equations 7 to 9.

[Math. 10]

$$\ddot{x}_1 = -\frac{x_1 \dot{x}_1}{\sqrt{l_1^2 - x_1^2}} + M^{-1}(-C\dot{x}_1 + p^{-1}u) \quad \text{(Equation 10)}$$

$$M = \frac{m_1 l_1^2}{3}$$

From the above, a prediction model of this modification can be represented by Equation 11 below by taking Equation 10 and the integral term represented by the product of a deviation and a predetermined integral gain into consideration.

[Math. 11]

$$\dot{x}(t) = P(x(t), u(t)) \quad \text{(Equation 11)}$$

$$= \begin{bmatrix} \dot{x}_1 \\ \ddot{x}_1 \\ \dot{z}_1 \end{bmatrix} = \begin{bmatrix} \dot{x}_1 \\ -\frac{x_1 \dot{x}_1}{l_1^2 - x_1^2} + M^{-1}(-C\dot{x}_1 + u) \\ \frac{x_{f1} - x_1}{\exp(|x_{f1} - x_1| * K_r)} \end{bmatrix}$$

Where $K_r$ is a constant corresponding to the constant C1 in Equation 6.

Second Embodiment

Although one control axis is included in the plant 6 in the control system illustrated in FIG. 1, still another control axis may be included and the servo driver 4 may perform servo control on the plant 6 including a plurality of control axes. In such a case, a prediction model included in the model predictive control unit 43 can be represented by Equation 12 below. The prediction model represented by Equation 12 corresponds to a case in which two control axes are included in the plant 6.

[Math. 12]

$$\dot{x}(t) = P(x(t), u(t)) \quad \text{(Equation 12)}$$

$$= \begin{bmatrix} \dot{x}_1 \\ \dot{x}_2 \\ \ddot{x}_1 \\ \ddot{x}_2 \\ \dot{z}_1 \\ \dot{z}_2 \end{bmatrix} = \begin{bmatrix} \dot{x}_1 \\ \dot{x}_2 \\ \dfrac{u_1}{M_1} \\ \dfrac{u_2}{M_2} \\ (x_{f1} - x_1) \cdot K_{i1} \\ (x_{f2} - x_2) \cdot K_{i2} \end{bmatrix}$$

Subscripts in Equation 12 correspond to control axes similarly to Equation 5. Variables x1 and x2 in the state x represent the output positions of the first and second control axes of the plant 6 and are parameters fed back as the output y of the plant 6. Moreover, $x_{f1}$ and $x_{f2}$ represent the position commands r to the control axes. Therefore, $(x_{f1} - x_1)$ and $(x_{f2} - x_2)$ in the prediction model represent the deviations e of the control axes. It can be understood that the prediction model includes integral terms represented by the products between the deviations e and the predetermined integral gains $K_{i1}$ and $K_{i2}$ corresponding to the respective control axes. When the integral terms are included in the prediction model, control structures in which another virtual integrator separate from the integrator 41 is connected in parallel, corresponding to the respective control axes can be obtained in the servo driver 4. In this way, it is easy to adjust an integration amount serving as a driving source of the servo control performed by the servo driver 4 which uses model predictive control, and it is easy to realize servo control suppressing an overshoot.

Figure 7A:
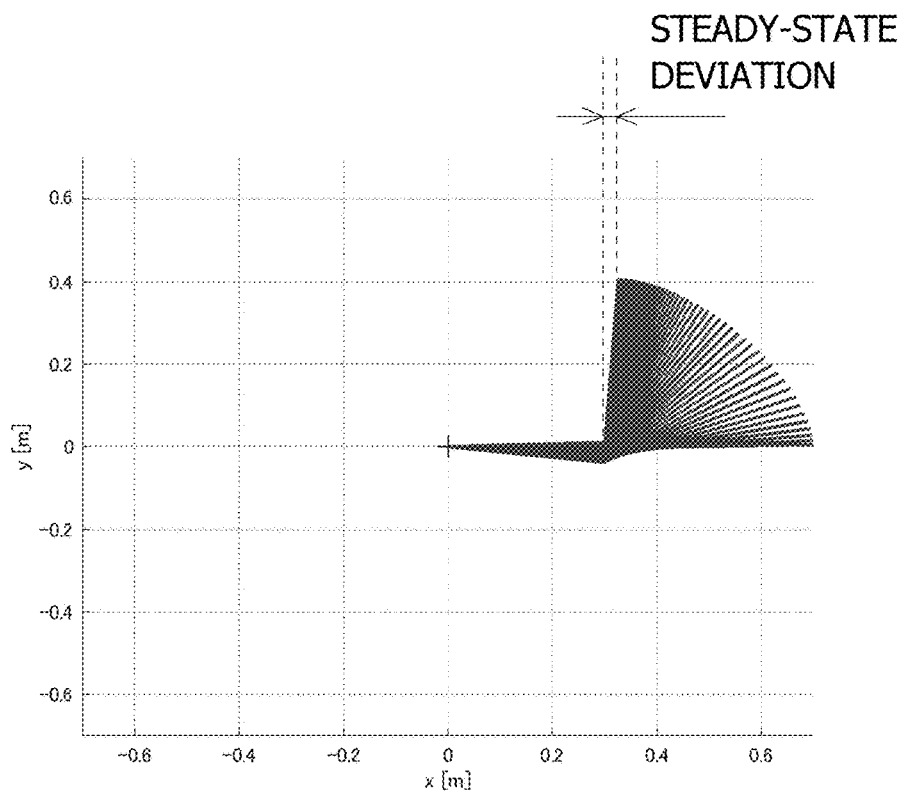
FIGS. 7A and 7B are first diagrams illustrating the results of trackability when two control axes are servo-controlled by a servo driver included in the control system illustrated in FIG. 1.
Figure 7B:
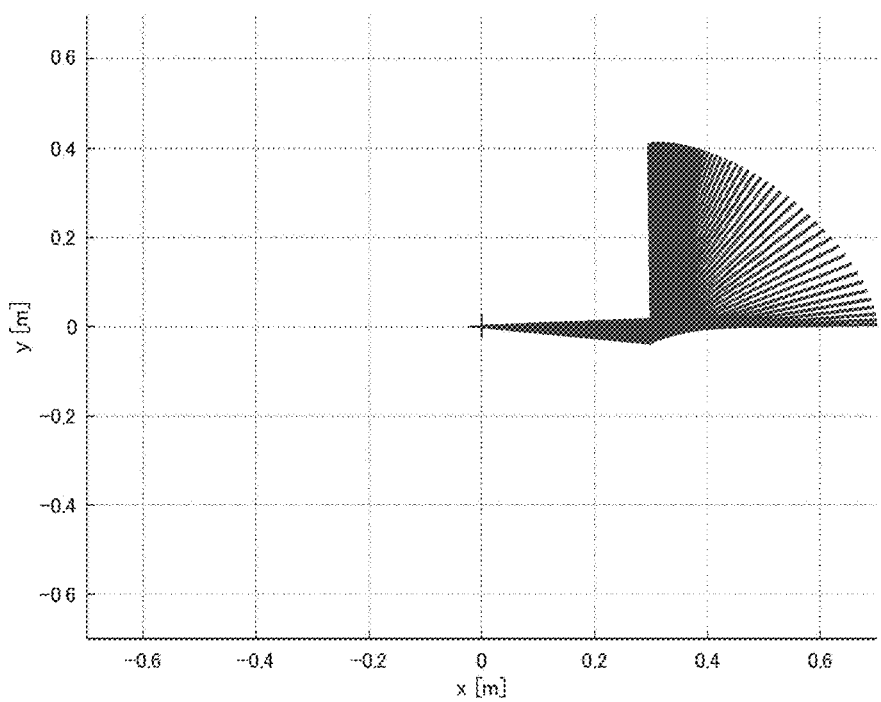

FIGS. 7A and 7B illustrate a diagram that traces the trajectory of a robot arm made up of two control axes when the servo driver 4 having the above-described configuration servo-controls an operation of bending the arm at 90 degrees. FIG. 7A illustrates the results of a control operation of bending a robot arm according to the conventional technique, and model predictive control is performed according to the conventional technique, a servo driver is generally configured as a regulator in order to avoid deterioration of a transient response such as an overshoot. Therefore, if a continuous disturbance occurs, a steady-state deviation is likely to occur due to the influence of the disturbance. In contrast, in the servo control performed by the servo driver 4 of the present embodiment illustrated in FIG. 7B, a steady-state deviation is eliminated effectively, and trackability to commands is improved without causing any overshoot.

Here, when the servo driver 4 performs servo control of a plurality of control axes, the predetermined integral gains adjusted by the gain adjustment unit 44 in the model predictive control corresponding to the respective control axes are preferably adjusted by taking the trackability to the commands at the respective control axes into consideration. The overall output of the plant 6 can be optimized by taking a balance of the trackabilities between the control axes into consideration. Therefore, the following two modes will be illustrated as a method for adjusting the predetermined integral gain by taking a balance of the trackabilities between the control axes into consideration. In the present embodiment, the number of control axes serving as the target of the servo control of the servo driver 4 is two.

<First Gain Adjustment Mode>

When the prediction model of the model predictive control unit 43 is represented by Equation 12, a predetermined integral gain $K_{i1}$ corresponding to a first control axis and a predetermined integral gain Kit corresponding to a second control axis are calculated on the basis of Equation 13 below.

[Math. 13]

$$K_{i1} = \frac{|x_{f1} - x_1|}{|x_{f1} - x_1| + |x_{f2} - x_2|} \quad \text{(Equation 13)}$$

$$K_{i2} = \frac{|x_{f2} - x_2|}{|x_{f1} - x_1| + |x_{f2} - x_2|}$$

where $K_i = 1$ for $|x_{f1} - x_1| + |x_{f2} - x_2| = 0$

The adjustment of the predetermined integral gains $K_{i1}$ and Kia according to Equation 13 means adjustment according to the magnitude of the deviation e corresponding to each control axis. Specifically, when a deviation in one control axis is relatively larger than a deviation in the other control axis, the values of the predetermined integral gains $K_{i1}$ and Kit are determined according to the relative proportion. That is, the predetermined integral gains are adjusted such that the value of the corresponding integral gain increases as the magnitude of the relative deviation increases. This means that, the larger the deviation of a control axis, the larger becomes the predetermined integral gain, and therefore, the trackabilities to commands can be enhanced by accumulating an integration amount. As a result, it is possible to equalize the final trackabilities to commands between control axes.

As another method, the predetermined integral gain $K_{i1}$ corresponding to the first control axis and the predetermined integral gain $K_{i2}$ corresponding to the second control axis can be calculated on the basis of Equation 14 below.

[Math. 14]

$$K_{i1} = \frac{\left|\dfrac{x_{f1} - x_1}{x_{f1} - x_{s1}}\right|}{\left|\dfrac{x_{f1} - x_1}{x_{f1} - x_{s1}}\right| + \left|\dfrac{x_{f2} - x_2}{x_{f2} - x_{s2}}\right|} \quad \text{(Equation 14)}$$

$$K_{i1} = \frac{\left|\dfrac{x_{f2} - x_2}{x_{f2} - x_{s2}}\right|}{\left|\dfrac{x_{f1} - x_1}{x_{f1} - x_{s1}}\right| + \left|\dfrac{x_{f2} - x_2}{x_{f2} - x_{s2}}\right|}$$

where $$K_i = 1 \text{ for } \left|\dfrac{x_{f1} - x_1}{x_{f1} - x_{s1}}\right| + \left|\dfrac{x_{f2} - x_2}{x_{f2} - x_{s2}}\right| = 0$$

$x_{s1}$ and $x_{s2}$ in Equation 14 are target positions of the control axes, and Equation 14 is a calculation formula for adjusting the predetermined integral gains $K_{i1}$ and $K_{i2}$ according to the magnitude of a deviation percentage to targets corresponding to the respective control axes. Therefore, according to Equation 14, in each control axis, the value of the corresponding predetermined integral gain is adjusted to be large as the magnitude of the relative deviation increases, and therefore, it is possible to equalize the final trackabilities to commands between control axes.

<Second Gain Adjustment Mode>

A prediction model of the model predictive control unit 43 is as illustrated in Equation 12. In the second gain adjustment mode, a predetermined working coordinate system based on the first and second control axes is set in the plant 6. The predetermined integral gains $K_{i1}$ and $K_{i2}$ corresponding to the respective control axes are adjusted on the basis of deviations of the respective control axes in the working coordinate system. Specifically, the predetermined integral gain $K_{i1}$ corresponding to the first control axis and the predetermined integral gain $K_{i2}$ corresponding to the second control axis are calculated on the basis of Equation 15 below.

[Math. 15]

$$E_{wrk} = \sqrt{(x_{f1} - x_1)^2 + (x_{f2} - x_2)^2}$$
$$Eratio1 = \frac{|(x_{f1} - x_1)|}{E_{wrk}}$$
$$Eratio2 = 1 - Eratio1$$
$$K_{i1} = \frac{1}{\exp(Eratio1 \times E_{wrk} \times K_r)}$$
$$K_{i2} = \frac{1}{\exp(Eratio2 \times E_{wrk} \times K_r)}$$

(Equation 15)

Where Ewrk represents a deviation in the working coordinate system, Eratio1 and Eratio2 represent relative error ratios of the respective control axes, and Kr is a constant corresponding to the constant C1 in Equation 6. Calculation itself of the predetermined integral gains in Equation 15 is similar to Equation 6 described above.

Figure 8A:
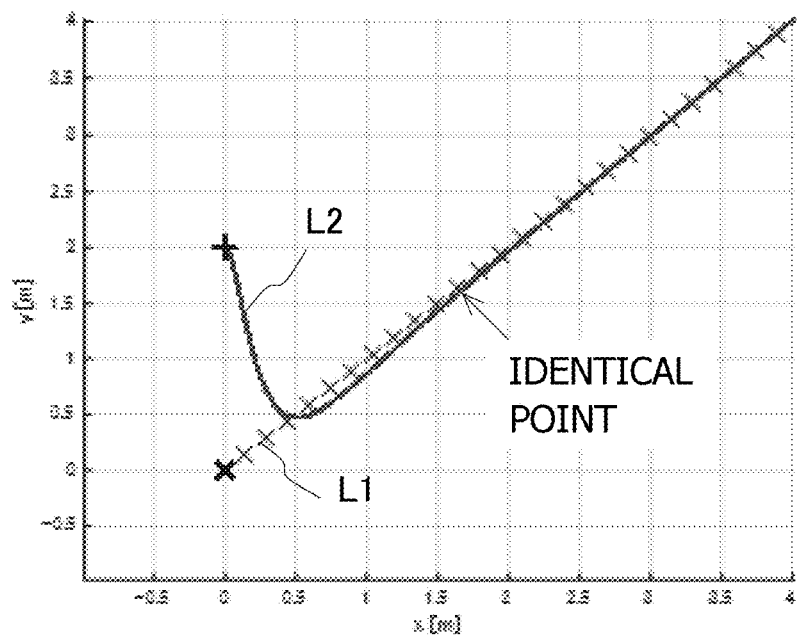
FIGS. 8A and 8B are second diagrams illustrating the results of trackability when two control axes are servo-controlled by a servo driver included in the control system illustrated in FIG. 1.
Figure 8B:
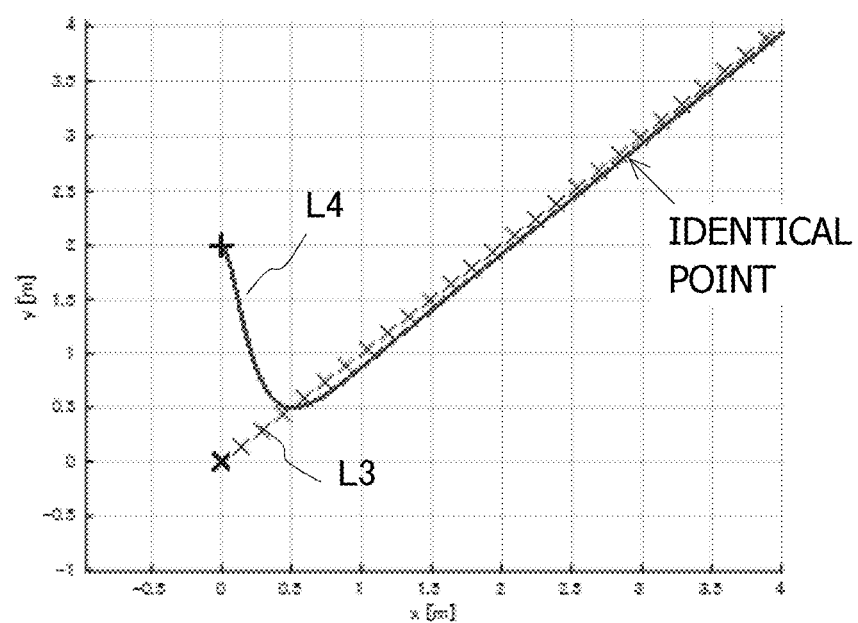

In FIGS. 8A and 8B, trajectories of commands in a working coordinate system in which the output of the first control axis set as a horizontal axis and the output of the second control axis is set as a vertical axis are represented by lines L1 and L3, and the trajectories of the outputs of the plant 6 which are the results of the servo control performed by the servo driver 4 are represented by lines L2 and L4. FIG. 8A corresponds to a case in which servo control is performed using the predetermined integral gains of the respective control axes calculated according to Equation 15, and FIG. 8B corresponds to a case in which servo control is performed using the predetermined integral gains of the respective control axes calculated according to Equation 16 without taking the deviations of the respective control axes of the working coordinate system into consideration. The line L1 in FIG. 8A and the line L3 in FIG. 8B are the same trajectory.

[Math. 16]

$$E_{gen1} = |x_{f1} - x_1|$$
$$E_{gen2} = |x_{f2} - x_2|$$
$$K_{i1} = \frac{1}{\exp(E_{gen1} \times K_r)}$$
$$K_{i2} = \frac{1}{\exp(E_{gen2} \times K_r)}$$

(Equation 16)

As illustrated in FIG. 8A, it is possible to allow the output (an output position) of the plant 6 in the working coordinate system to track the command ideally as compared to the case illustrated in FIG. 8B by adjusting the predetermined integral gains of the respective control axes by taking correlation between the deviations of the respective control axes in the working coordinate system into consideration. As a result, in the case illustrated in FIG. 8A, the output of the plant 6 in the working coordinate system becomes identical to the command in a relative early stage.

Third Embodiment

Another mode of adjustment of the predetermined integral gain Ki by the gain adjustment unit 44 included in the servo driver 4 will be described. In the present embodiment, similarly to the above-described embodiment, the gain adjustment unit 44 adjusts the predetermined integral gain $K_i$ so that the value of the predetermined integral gain $K_i$ increases as the magnitude of the deviation e decreases. However, an integration process using the predetermined integral gain $K_i$ is performed only when a predetermined condition is satisfied.

In the present embodiment, the predetermined condition is that the gain adjustment unit 44 performs adjustment of the predetermined integral gain $K_i$ when the value of the deviation e belongs to a predetermined first range including zero and an integration process is performed according to the adjusted predetermined integral gain $K_i$. In contrast, when the value of the deviation e does not belong to the predetermined first range, the predetermined integral gain $K_i$ is set to zero so that an integration process is not performed substantially. As an example, when the output of the plant 6 is two-dimensional, the predetermined first range can be defined by a downwardly convex function f(x). In such a case, the predetermined integral gain $K_i$ is set in the following manner whereby the adjustment of the predetermined integral gain $K_i$ by the gain adjustment unit 44 of the present embodiment is realized.

$$K_i = \alpha(|f(x)| - f(x))$$

Where α is a predetermined coefficient.

By representing the predetermined integral gain $K_i$ using a function in this manner, in a program process of model predictive control based on the continuous deformation method, it is possible to adjust the value of the predetermined integral gain $K_i$ (for example, $K_i=0$) without performing a conditional determination process and it is easy to generate a program for model predictive control based on Equations 3 and 4 described above.

Moreover, the predetermined first range may be defined as an upwardly convex function f(x). In such a case, the predetermined integral gain $K_i$ can be set as follows.

$$K_i = \alpha(|f(x)| + f(x))$$

Here, when the output of the plant 6 is two-dimensional, if the predetermined first range is set as a circle having a predetermined radius (r) about a target position of the output of the plant 6, the predetermined integral gain $K_i$ can be set according to Equation 17 below as an example.

[Math. 17]

$$K_i = \frac{1}{2r^2}(|(x_{f1} - x_1)^2 + (x_{f2} - x_2)^2 - r^2| - ((x_{f1} - x_1)^2 + (x_{f2} - x_2)^2 - r^2))$$

(Equation 17)

According to Equation 17, the predetermined integral gain $K_i$ is zero when the output (x1,x2) of the plant 6 is within a circle having a predetermined radius r about a target position (xf1,xf2) (that is, the deviation e is within the predetermined first range) and when the predetermined integral gain $K_i$ is set and the output of the plant 6 is outside the circle (that is, the deviation e is outside the predetermined first range). As a result, an integration process of model predictive control is performed in a limited region.

Figure 9A:
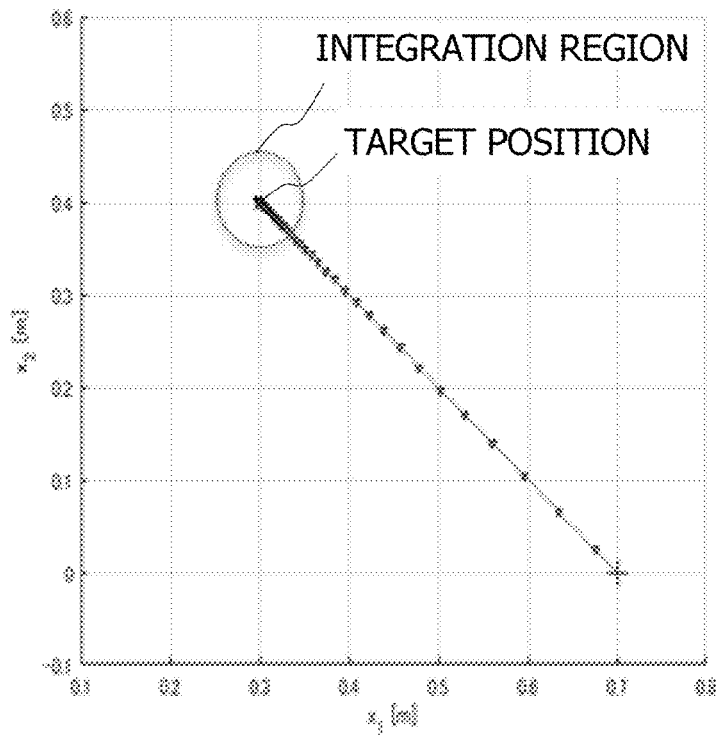
FIGS. 9A and 9B are third diagrams illustrating the results of trackability when two control axes are servo-controlled by a servo driver included in the control system illustrated in FIG. 1.
Figure 9B:
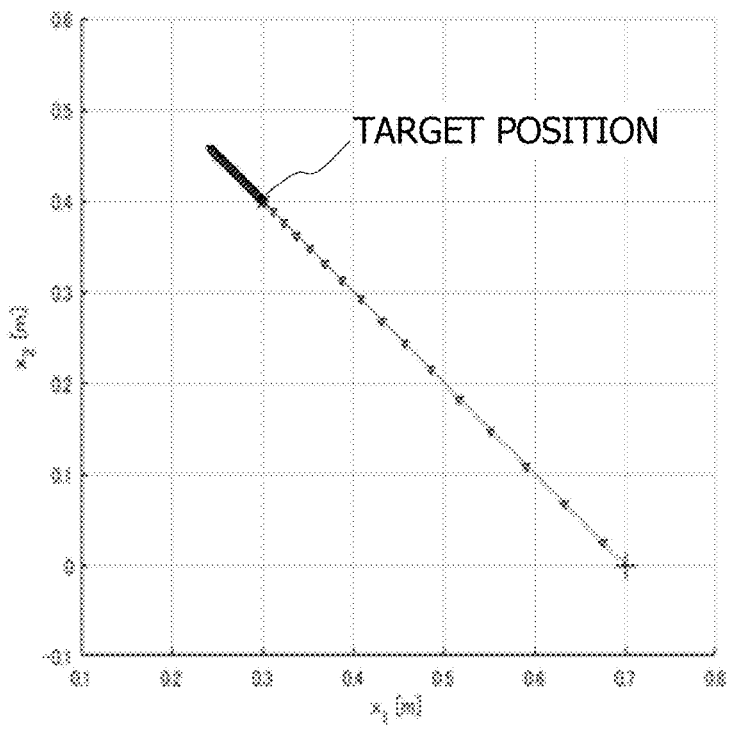

FIG. 9A illustrates the trajectory of an output of the plant 6 when the prediction model of the model predictive control unit 43 is represented by Equation 12 described above. In this diagram, a circle having a predetermined radius r about a target position is represented as the predetermined first range in which an integration process is performed. Moreover, FIG. 9B illustrates the trajectory of an output of the plant 6 in a mode (a mode where the predetermined integral gain is set to $K_i=1$ in an entire region) in which a region where an integration process is performed is not limited but an integration process is performed in an entire region as a comparative example. As is obvious from comparison between both cases, when a region where an integration process is performed is not limited, a relatively large overshoot occurs due to the influence of a deviation accumulated up to that time point before a target position is reached. In contrast, when the region where an integration process in model predictive control is performed is limited to the predetermined first range, excessive accumulation of deviations is suppressed, and occurrence of an overshoot is obviated ideally.

<Modification>

If an obstacle is present around the plant 6 controlled to track a command r, the plant 6 is requested to avoid collision with the obstacle. Whether the obstacle is moving or not does not matter. Therefore, in order to avoid collision between the plant 6 and the obstacle, a probabilistic potential field indicating the probability that an obstacle is present around the plant 6 is calculated and is applied to model predictive control. Calculation of the probabilistic potential field itself is a known technique, and the probabilistic potential field can be calculated using a technique disclosed in Japanese Patent Application Publication No. 2003-241836, for example. Specifically, the probabilistic potential field is applied to a stage cost (the second term on the right side of Equation 2 is a stage cost) of model predictive control according to Equation 18 below.

[Math. 18]

$$OD = \sqrt{(x_{d1} - x_1)^2 + (x_{d2} - x_2)^2}$$
$$OP = \frac{0.2}{\exp(OD)}$$
$$L = \frac{1}{2}((x_f - x)^T Q(x_f - x) + u^T Ru + OP)$$

(Equation 18)

OD indicates the distance between the position (xd1,xd2) of an obstacle and the position (x1,x2) of the plant 6, OP indicates a probabilistic potential of an obstacle, and L indicates a stage cost. In the stage cost L, Q and R are coefficients (weighting coefficients) indicating the weighting factor of a state quantity of the stage cost and the weighting factor of a control input.

Figure 10A:
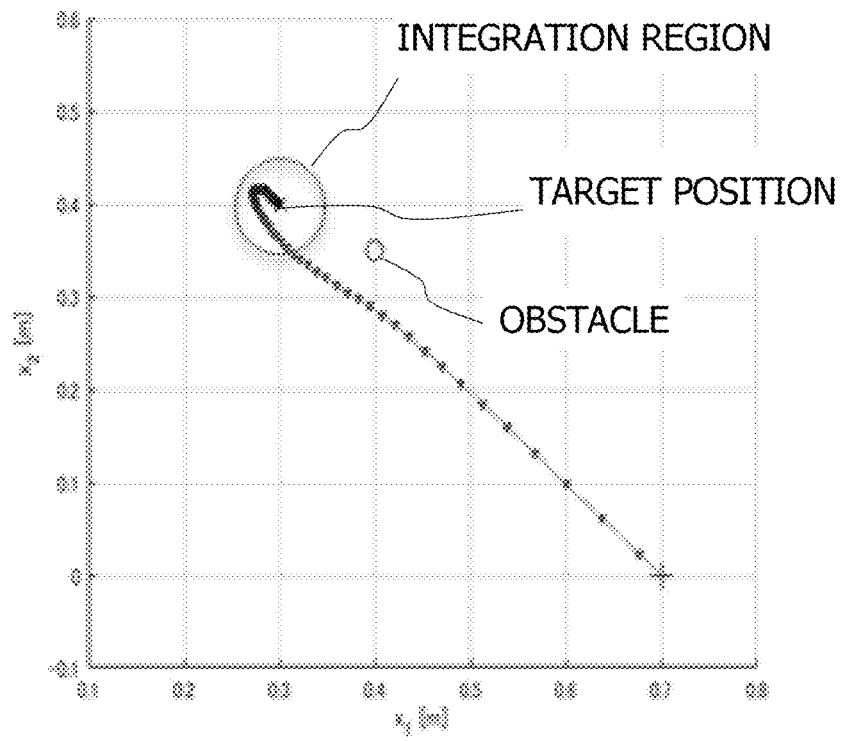
FIGS. 10A and 10B are fourth diagrams illustrating the results of trackability when two control axes are servo-controlled by a servo driver included in the control system illustrated in FIG. 1.
Figure 10B:
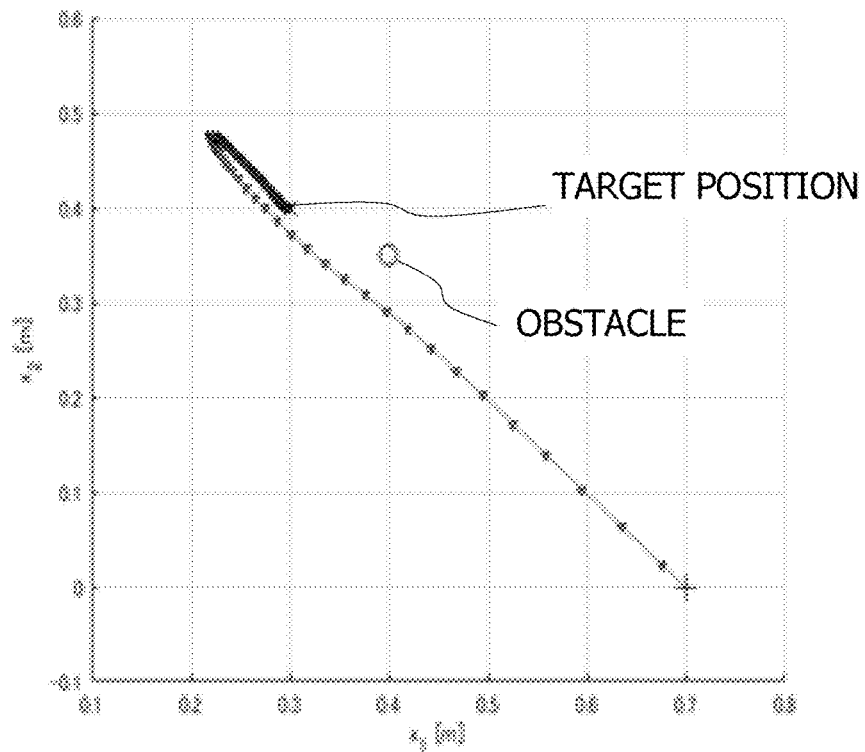

FIG. 10A illustrates the trajectory of the output of the plant 6 when the prediction model of the model predictive control unit 43 is represented by Equation 12 described above and the stage cost of the model predictive control is calculated as Equation 18. In this diagram, a circle having a predetermined radius r about a target position is illustrated as the predetermined first range in which an integration process is performed. Moreover, as a comparative example, FIG. 10B illustrates the trajectory of the output of the plant 6 in a mode (a mode where the predetermined integral gain is set to $K_i=1$ in an entire region) in which a region where an integration process is performed is not limited but an integration process is performed in an entire region. As is obvious from comparison between both cases, when a region where an integration process is performed is not limited, a relatively large overshoot occurs due to the influence of a repulsive force received from an obstacle or a deviation accumulated up to that time point before a target position is reached. In contrast, when the region where an integration process in model predictive control is performed is limited to the predetermined first range, accumulation of deviations can be suppressed to be as small as possible.

Fourth Embodiment

Figure 11:
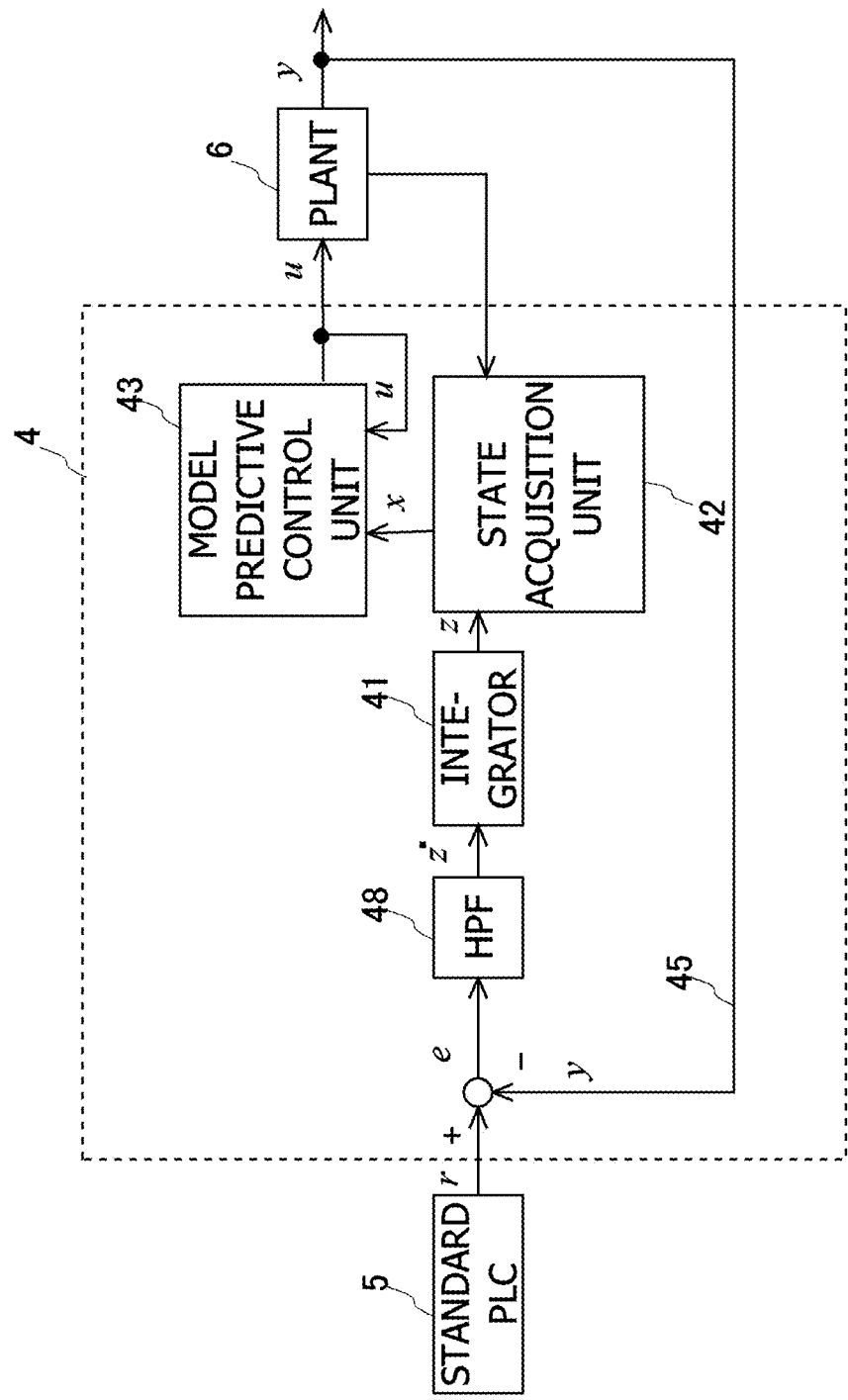
FIG. 11 is a second diagram illustrating a control structure of a servo driver included in the control system illustrated in FIG. 1.

In the present embodiment, another mode of the control structure of the servo driver 4 will be described with reference to FIG. 11. A difference of the control structure illustrated in FIG. 11 from the control structure illustrated in FIG. 2 is that the gain adjustment unit 44 is not included and that the deviation e is input to the integrator 41 through an HPF processing unit 48. Moreover, in an integration process by the integrator 41, the predetermined integral gain $K_i$ is set to one.

The HPF processing unit 48 performs a high-pass filtering process on the deviation e. In the high-pass filtering process, when the value of the deviation e belongs to a predetermined second range including zero, a cutoff frequency thereof is set to zero, and the deviation e is input to the integrator 41 substantially as it is. In contrast, when the value of the deviation e is outside the predetermined second range, the cutoff frequency is adjusted according to the deviation e. Specifically, when the value of the deviation e is outside the predetermined second range, the cutoff frequency is set to be low as the magnitude of the deviation e approaches a boundary of the predetermined second range and is set to zero when the magnitude reaches the boundary.

A transfer function of the HPF processing unit having the above-described configuration is represented by Equation 19 below.

[Math. 19]

$$\frac{\dot{z}}{e} = \frac{s}{s + K_j}$$

(Equation 19)

Kj is a predetermined filtering gain correlated with the high-pass filtering process. Equation 20 below is derived on the basis of the transfer function.

[Math. 20]

$$\ddot{z} = s e - K_j \dot{z} = s(e - K_j z)$$

$$\dot{z} = (e - K_j z)$$

(Equation 20)

By applying Equation 20, a prediction model of the model predictive control unit 43 related to the plant 6 having a two-dimensional output (two control axes) can be represented by Equation 21 below.

[Math. 21]

$$\dot{x}(t) = P(x(t), u(t)) \quad \text{(Equation 21)}$$

$$= \begin{bmatrix} \dot{x}_1 \\ \dot{x}_2 \\ \ddot{x}_1 \\ \ddot{x}_2 \\ \dot{z}_1 \\ \dot{z}_2 \end{bmatrix} = \begin{bmatrix} \dot{x}_1 \\ x_2 \\ \dfrac{u_1}{M_1} \\ \dfrac{u_2}{M_2} \\ (x_{f1} - x_1) - K_{j1} \cdot x_5 \\ (x_{f2} - x_2) - K_{j2} \cdot x_6 \end{bmatrix}$$

x5 is the output of the integrator 41 in a first control axis, x6 is the output of the integrator 41 in a second control axis, and (xf1−x1)−Kj1·x5 and (xf2−x2)−Kj2·x6 in Equation 21 correspond to HPF processing terms correspond to the first and second control axes, respectively.

Here, when the output of the plant 6 is two-dimensional, the predetermined second range can be defined as a downwardly convex function f(x). In such a case, the predetermined filtering gain $K_j$ is set as below, whereby the high-pass filtering process is realized.

$$K_j = \alpha(|f(x)| + f(x))$$

α is a predetermined coefficient.

By representing the predetermined high-pass filtering gain $K_j$ using a function in this manner, in a program process of model predictive control based on the continuous deformation method, it is possible to adjust the value of the predetermined integral gain $K_i$ (for example, $K_i$=0) without performing a conditional determination process and it is easy to generate a program for model predictive control based on Equations 3 and 4 described above.

Moreover, the predetermined second range may be defined as an upwardly convex function f(x). In such a case, the predetermined filtering gain $K_j$ can be set as follows.

$$K_j = \alpha(|f(x)| - f(x))$$

Here, when the output of the plant 6 is two-dimensional, if the predetermined second range is set as a circle having a predetermined radius (r) about a target position of the output of the plant 6, the predetermined filtering gain $K_j$ can be set according to Equation 22 below as an example.

[Math. 22]

$$K_j = \frac{1}{2r^2}(|(x_{f1} - x_1)^2 + (x_{f2} - x_2)^2 - r^2| + ((x_{f1} - x_1)^2 + (x_{f2} - x_2)^2 - r^2)) \quad \text{(Equation 22)}$$

According to Equation 22, the predetermined filtering gain $K_j$ is set to zero and the integration process of the integrator 41 is performed when the output (x1,x2) of the plant 6 is within a circle having a predetermined radius r about a target position (xf1,xf2) (that is, the deviation e is within the predetermined second range). In contrast, when the output of the plant 6 is outside the circle (that is, the deviation e is outside the predetermined second range), the predetermined filtering gain $K_j$ is adjusted so that the high-pass filtering process is applied. The high-pass filtering process is performed on the deviation e whereby the influence of a relatively old deviation e is alleviated.

As described above, according to the present embodiment, an overshoot resulting from accumulation of an integration amount of deviations when the deviation e is relatively large is suppressed. Moreover, when the filtering gain $K_j$ correlated with the high-pass filtering process is correlated with a distance to the predetermined second range in which the integration process of the integrator 41 is performed by setting the cutoff frequency of the high-pass filtering process in the above-described manner, it is possible to suppress accumulation of an integration amount as the value of the deviation e deviates from the region and to contribute to suppression of an overshoot. The control structure of the servo driver 4 may include a control element (for example, a predetermined gain or the like) other than the integrator 41 and the HPF processing unit 48.

Figure 12A:
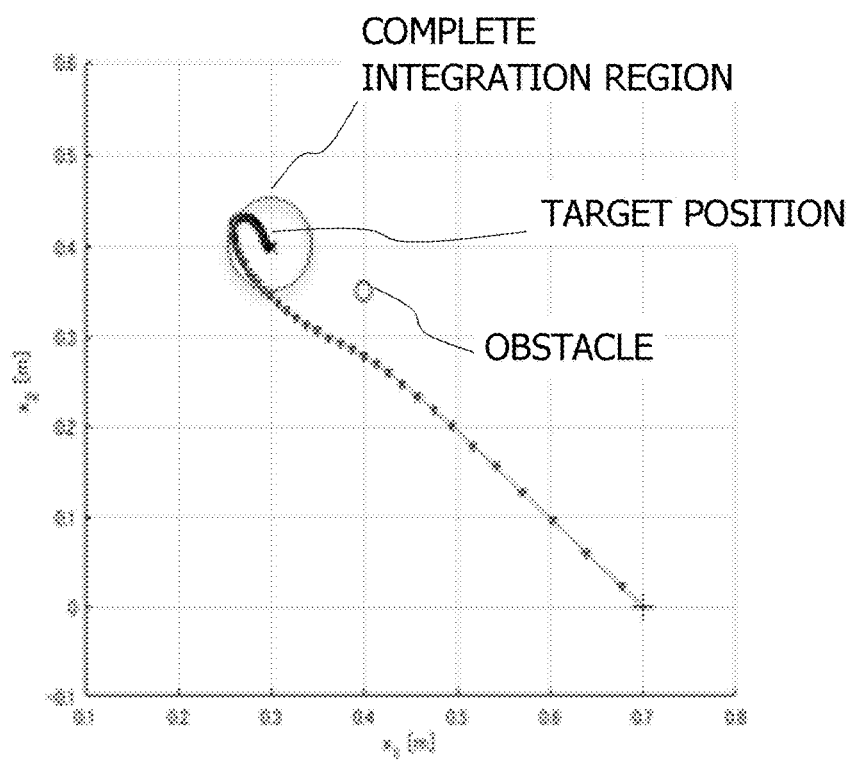
FIGS. 12A and 12B are diagrams illustrating the results of trackability when two control axes are servo-controlled by a servo driver illustrated in FIG. 11.
Figure 12B:
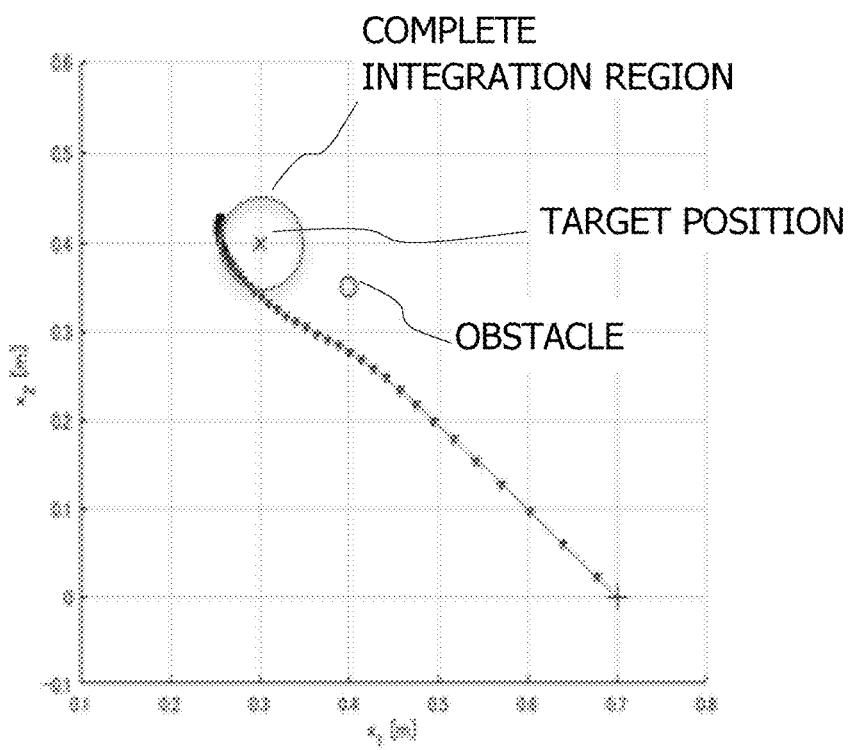

FIG. 12A illustrates the trajectory of the output of the plant 6 when the prediction model of the model predictive control unit 43 is represented by Equation 21 described above. In this diagram, a circle having a predetermined radius r about a target position is illustrated as a "complete integration region" as a predetermined second range of the integration process (a predetermined integral gain $K_i$=1) by the integrator 41. Moreover, FIG. 12B illustrates the trajectory of the output of the plant 6 in a mode in which the region where the integration process (the predetermined integral gain $K_i$=1) by the integrator 41 is the same as that of FIG. 12A but the HPF processing unit 48 is not included in the control structure as a comparative example. In calculation of these trajectories, servo control to the target position is performed while avoiding collision with an obstacle using the stage cost illustrated in Equation 18. As is obvious from comparison between both cases, when the HPF processing unit 48 is not included, the target position is not reached due to the influence of a repulsive force received from an obstacle. In contrast, when the HPF processing unit 48 is included, the target position is reached while suppressing an overshoot.

Fifth Embodiment

In the above-described embodiment, the control structure including the model predictive control unit 43 formed in the servo driver 4 has been described. However, in the present embodiment, a control structure which includes a model predictive control unit 53 corresponding to the model predictive control unit 43 and is formed in the standard PLC 5 will be described with reference to FIG. 13. The standard PLC 5 includes a command generation unit 50, an integrator 51, a state acquisition unit 52, a model predictive control unit 53, a gain adjustment unit 54, and a plant model 56. Since the integrator 51, the state acquisition unit 52, the model predictive control unit 53, and the gain adjustment unit 54 substantially correspond to the integrator 41, the state acquisition unit 42, the model predictive control unit 43, and the gain adjustment unit 44 illustrated in FIG. 2, respectively, the detailed description thereof will be omitted.

The command generation unit 50 generates a command r for instructing the output of the plant 6. In the present embodiment, the command r is provided to model predictive control of the model predictive control unit 53 rather than being supplied from the standard PLC 5 directly to the servo driver 4. Moreover, the plant model 56 has a plant model (corresponding to an actual target model of the present application) that models the plant 6 and simulates the output of the plant 6 using the plant model. The simulation result is used as an output y of the plant model 56. The output y of the plant model 56 is fed back to an input side of the integrator 51 by a feedback system 55.

Here, in the present embodiment, a deviation e (e=r−y) between the command r generated by the command generation unit 50 and the output y of the plant model 56 fed back by the feedback system 55 is input to the integrator 51. An output z of the integrator 51 is input to the model predictive control unit 53 through the state acquisition unit 52.

Here, the state acquisition unit 52 acquires a value x of a state variable included in a state x related to the plant model that models the plant 6, provided to the model predictive control performed by the model predictive control unit 53. For example, a value of a predetermined parameter obtained in the simulation process of the plant model 56 can be acquired as the state variable included in the state x. Furthermore, in the present embodiment, the state acquisition unit 52 acquires z which is the output of the integrator 51 as the state variable included in the state x. The model predictive control unit 53 executes model predictive control using the state x related to the plant model acquired by the state acquisition unit 52 and the input u to the plant model 56 output by the model predictive control unit 53. In the model predictive control performed by the model predictive control unit 53, an integral term represented by the product of the deviation e and the predetermined integral gain is included in the prediction model used in the model predictive control similarly to the model predictive control performed by the model predictive control unit 43 illustrated in First and Second Embodiments.

Figure 13:
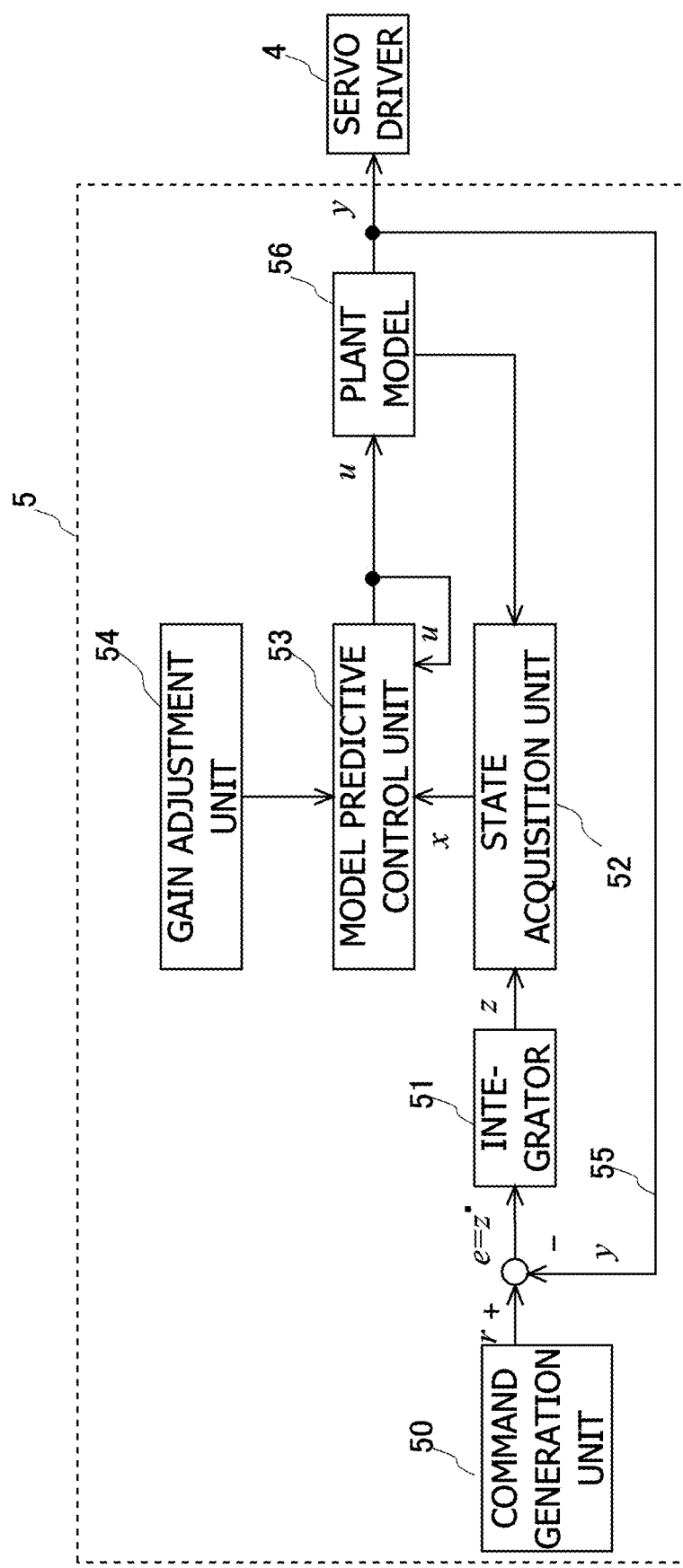
FIG. 13 is a diagram illustrating a control structure of a standard PLC included in a control system illustrated in FIG. 1.

Due to the control structure formed in this manner, the standard PLC 5 illustrated in FIG. 13 can supply the output y which is the simulation result of the plant model 56 to the servo driver 4 as a command for ideally tracking the command r while suppressing the output of the plant 6 from entering an overshoot state. That is, the standard PLC 5 can suppress occurrence of a steady-state deviation in the output of the plant 6 while performing model predictive control even when the target trajectory changes frequently according to the command r although the control amount of the plant 6 which is the actual control target is not fed back directly.

REFERENCE SIGNS LIST

1 Network
2 Motor
3 Load device
4 Servo driver
5 Standard PLC
6 Plant

The invention claimed is:

1. A control device that executes model predictive control related to a predetermined control target corresponding to an actual target device which is an actual target of servo control in order to cause an output of the actual target device to track a predetermined command, the control device comprising:
   an integrator which receives input of a deviation between the predetermined command and an output of the predetermined control target;
   a state acquisition unit that acquires a value of a predetermined state variable related to the predetermined control target;
   a model predictive control unit which has a prediction model that defines a correlation between the predetermined state variable and an input to the predetermined control target in a form of a predetermined state equation, and which performs the model predictive control based on the prediction model according to a predetermined evaluation function in a prediction section having a predetermined time width using the output of the integrator as an input, and outputs a value of the input at least at an initial time point of the prediction section as an input to the predetermined control target corresponding to the predetermined command, and
   a gain adjustment unit that adjusts a predetermined integral gain so that the predetermined integral gain increases as a magnitude of the deviation decreases, wherein
   the prediction model includes a predetermined integral term represented by a product of the predetermined integral gain and the deviation between the output of the predetermined control target and the predetermined command.

2. The control device according to claim 1, wherein
   the predetermined control target comprises the actual target device itself,
   the control device further comprises a feedback system that feeds back the output of the actual target device,
   the integrator further receives the input of the deviation between the predetermined command and the output of the actual target device fed back by the feedback system,
   the state acquisition unit further acquires a value of the predetermined state variable related to the actual target device, and
   the prediction model comprises a model that defines a correlation between the predetermined state variable and the input to the actual target device, and the predetermined integral term included in the prediction model is represented by a product of the predetermined integral gain and a deviation between the output of the actual target device and the predetermined command.

3. The control device according to claim 1, further comprising:
   an actual target model control unit which includes an actual target model which is a model that models the actual target model and which is the predetermined control target and which simulates and outputs an output of the actual target device, wherein
   the output of the actual target model control unit is configured to be supplied to the actual target device,
   a deviation between the predetermined command and the output of the actual target model control unit is input to the integrator,
   the state acquisition unit further acquires a value of the predetermined state variable related to the actual target model included in the actual target model control unit, and
   the prediction model comprises a model that defines a correlation between the predetermined state variable and the input to the actual target model control unit, and the predetermined integral term included in the prediction model is represented by a product of the predetermined integral gain and a deviation between the output of the actual target model and the predetermined command.

4. The control device according to claim 1, wherein
   the gain adjustment unit further adjusts the predetermined integral gain such that the predetermined integral gain increases as the magnitude of the deviation decreases when the value of the deviation belongs to a predetermined first range including zero and sets the predetermined integral gain to zero when the value of the deviation does not belong to the predetermined first range.

5. The control device according to claim 4, wherein
the predetermined control target has a two-dimensional output,
the predetermined first range is defined by a downwardly convex function f(x), and
the predetermined integral gain is represented by a function of $\alpha(|f(x)|+f(x))$, where $\alpha$ is a predetermined coefficient.

6. The control device according to claim 4, wherein
the predetermined control target has a two-dimensional output,
the predetermined first range is defined by an upwardly convex function f(x), and
the predetermined integral gain is represented by a function of a $\alpha(|f(x)|+f(x))$ where $\alpha$ is a predetermined coefficient.

7. The control device according to claim 1, wherein
the predetermined control target has a plurality of control axes,
a command to the predetermined control target, an input to the predetermined control target, and an output to the predetermined control target are correlated with the plurality of control axes, and
the prediction model is defined by the predetermined state equation so as to correspond to each of the plurality of control axes and includes a plurality of the predetermined integral terms corresponding to the plurality of control axes.

8. The control device according to claim 7, wherein
the gain adjustment unit further adjusts the predetermined integral gain corresponding to each of the plurality of control axes according to the magnitude of the deviation corresponding to each of the plurality of control axes, and
the gain adjustment unit further adjusts the predetermined integral gain corresponding to each of the plurality of control axes so as to increase as a relative magnitude of the deviation corresponding to each of the plurality of control axes increases.

9. The control device according to claim 7, wherein
a predetermined working coordinate system is set in the predetermined control target on the basis of the plurality of control axes,
the gain adjustment unit further adjusts the predetermined integral gain corresponding to each of the plurality of control axes according to a magnitude in the predetermined working coordinate system, of the deviation corresponding to each of the plurality of control axes, and
the gain adjustment unit further adjusts the predetermined integral gain corresponding to each of the plurality of control axes so as to increase as a relative magnitude of the deviation converted to the predetermined working coordinate system, corresponding to each of the plurality of control axes increases.

10. The control device according to claim 1, wherein the gain adjustment unit further calculates the predetermined integral gain according to a gain setting function that is differentiable on the basis of the deviation.

11. The control device according to claim 1, wherein
the gain adjustment unit includes a gain setting function related to the deviation, for calculating the predetermined integral gain, and is further configured to
calculate, when the gain setting function is differentiable on the basis of the deviation, the predetermined integral gain according to the gain setting function, and
perform, when the gain setting function is not differentiable on the basis of the deviation, a predetermined stabilization process for stabilizing an arithmetic process of the model predictive control by the model predictive control unit and calculates the predetermined integral gain according to the gain setting function.

12. The control device according to claim 1, wherein
the prediction model includes a high pass filter processing term represented by a product of the output of the integrator and a predetermined filtering gain correlated with a high-pass filtering process on the deviation in addition to the predetermined integral term wherein the predetermined integral gain is one,
when the value of the deviation is outside a predetermined second range including zero, the predetermined filtering gain is set such that a cutoff frequency decreases as the magnitude of the deviation approaches a boundary of the predetermined second range in the high-pass filtering process, and
when the value of the deviation belongs to the predetermined second range, the predetermined filtering gain is set to zero.

* * * * *